(12) United States Patent
Huang et al.

(10) Patent No.: US 9,876,877 B2
(45) Date of Patent: Jan. 23, 2018

(54) SPECIAL HANDLING OF A LANDING PAGE

(71) Applicant: Verizon Patent and Licensing Inc., Arlington, VA (US)

(72) Inventors: Jian Huang, Sudbury, MA (US); Gong Zhang, Waltham, MA (US); Sayan Dey, Framingham, MA (US); Fnu Bongu Huma Shankar Rao, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 179 days.

(21) Appl. No.: 15/017,884

(22) Filed: Feb. 8, 2016

(65) Prior Publication Data
US 2017/0230478 A1    Aug. 10, 2017

(51) Int. Cl.
*G06F 15/16* (2006.01)
*H04L 29/08* (2006.01)
*G06Q 30/02* (2012.01)

(52) U.S. Cl.
CPC ....... *H04L 67/327* (2013.01); *G06Q 30/0273* (2013.01); *H04L 67/02* (2013.01); *H04L 67/141* (2013.01)

(58) Field of Classification Search
CPC ..... H04L 67/327; H04L 67/02; H04L 67/141; G06F 30/0273

USPC .......................................... 709/246
See application file for complete search history.

(56) References Cited

U.S. PATENT DOCUMENTS

| | | | |
|---|---|---|---|
| 2009/0313318 A1* | 12/2009 | Dye | G06Q 30/00 709/202 |
| 2014/0108373 A1* | 4/2014 | Abrahami | G06F 17/30893 707/706 |
| 2015/0019690 A1* | 1/2015 | Sarat | H04L 67/02 709/219 |
| 2016/0253718 A1* | 9/2016 | Carasso | G06Q 30/0277 705/14.73 |

* cited by examiner

*Primary Examiner* — Alan S Chou

(57) ABSTRACT

A device intercepts a request that includes a network address or a universal resource locator (URL) for a landing page and determines whether special handling is applicable when forwarding the landing page to the requesting device. When the special handling is applicable, the request is automatically redirected to a validation device, which determines whether the requesting device is eligible for the special handling. The validation device signs based on the determination and returns the signed request to the requesting device. The requesting device forwards the signed request to request the landing page and the special handling is selectively applied based on the signed request.

20 Claims, 7 Drawing Sheets

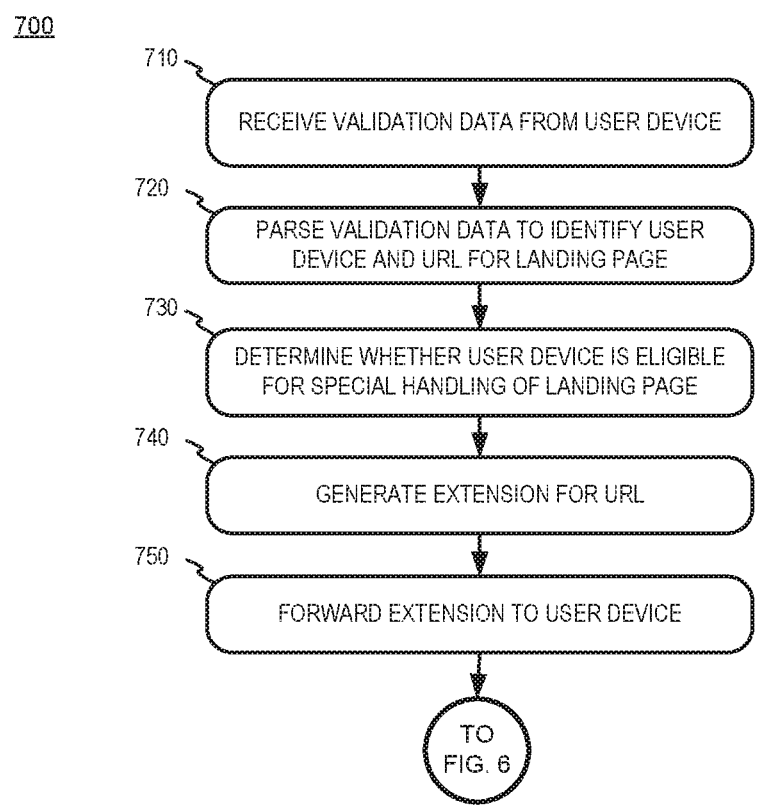

SPECIAL HANDLING OF A LANDING PAGE

BACKGROUND

When a user device, such as a computer or smart phone, initially accesses a website (or domain), the website may present a "landing page" that identifies various content (e.g., other webpages, multimedia content, programs, services, etc.) that can be accessed through the website. A service network may provide the user device with access to the website and the associated content. In certain instances, the service network may provide special handling of certain content from the website. In one example, the service network may transmit certain data to the user device using a specialized path that provides certain performance attributes (e.g., certain levels of bandwidth, delay, jitter, packet losses, etc.). In another example, the service network may transmit certain data to the user device using a different protocol, priority (e.g., quality of service value) and/or access fees. For instance, user access to wireless communication networks and data services typically involves some form of payment made to the network provider, but in some instances, a third party (e.g., a content provider) may sponsor a user's data consumption in order to entice user engagement. Access to sponsored data may involve data exchanges between the content provider and the service network that has not yet occurred when the landing page is accessed by the user device. Thus, the landing page may not receive special handling within the service network.

BRIEF DESCRIPTION OF THE DRAWINGS

FIG. 7 is a flow chart showing an exemplary process for determining whether a user device of the environment in FIG. 1 is eligible for special handling of a landing page.

DETAILED DESCRIPTION OF THE PREFERRED EMBODIMENTS

Figure 1:
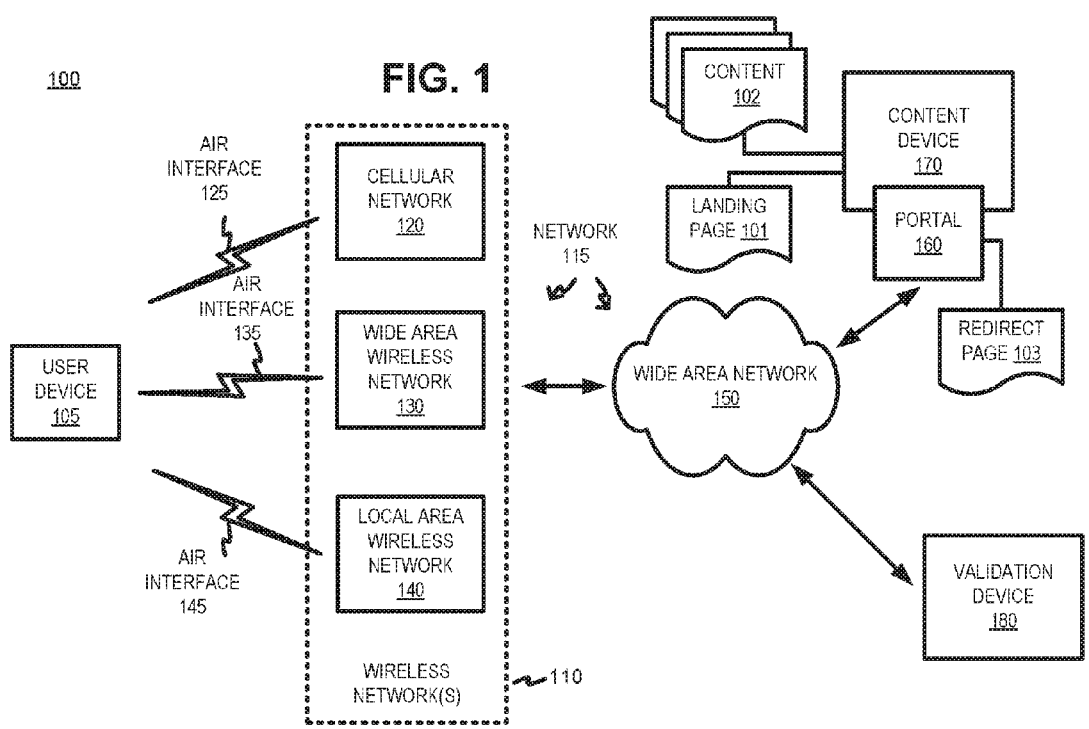
FIG. 1 is a block diagram of an exemplary environment for providing special handling of a landing page.

The following detailed description refers to the accompanying drawings. The same reference numbers in different drawings may identify the same or similar elements. The following detailed description does not limit the invention.

Certain embodiments described herein are directed to selectively providing special handling of a landing (or "home") page. As used herein, the landing page may identify content (e.g., data and/or services) that are available through a content device, and the landing page may enable access to the identified content. For example, the landing page may include a hyperlink (or "link") or other input element that may be selected by a user to the available content. The special handling may relate to the delivery of the landing page, such as transmitting the landing page along a specialized path that provides certain performance attributes (e.g., certain levels of bandwidth, delay, jitter, packet losses, etc.) and/or a path that includes a specific node.

In one example, the special handling may related to sponsored data services (also referred to herein as a "toll free data service") in which access to a landing page by a user device is financially supported by a third party entity. The third party entity, hereinafter referred to as a "sponsor," subsidizes the network data exchanged between a user device and a specified content provider. The sponsor may have a relationship with the network provider that permits the automatic billing of the sponsor for the exchanged data, instead of the user of a user device. Thus, the data exchanged through the sponsored data services (which may also be referred to herein as "sponsored data" or "sponsored content") is effectively "toll-free" as seen by the user of the user device.

The user device may use a network address associated with the landing page to request access to the landing page. To enable the user device to access the landing page through special handling (e.g., sponsored access) and ensure that the sponsor is billed for the sponsored data exchange, an extension for a network address associated with the landing page may be generated and used in connection with the network address to form a "signed" address. For example, the user device may be redirected to a validation device, and the validation device may determine whether the user device is eligible to receive special handling of the landing page. If the user device is eligible to receive special handling of the landing page, the validation device may "sign" the network address for the landing page (e.g., add an extension to the network address) and return the signed address to the user device. A user device may access sponsored content by making network requests using the signed network addresses. In an embodiment, the hyper-text transfer protocol (HTTP) may be used to exchange the data, so the signed network address for the landing page may take the form of a sponsored data service universal resource locator (URL) (hereinafter referred to as an "signed URL" or a "toll-free URL").

FIG. 1 is a block diagram of an exemplary environment 100 for selectively providing special handling of a landing page 101. Environment 100 may include, for example, a user device 105; a network 115 that includes one or more wireless network(s) 110, such as a cellular network 120, a wide area wireless network 130, and/or a local area wireless network 140 that may be accessed via air interfaces (or "wireless channels") 125, 135, and/or 145, and a wide area network 150; a portal 160; a content device 170, and a validation device 180.

As shown in FIG. 1, user device 105 may obtain access to network 115 through wireless network(s) 110 over any type of known radio channel or combinations thereof. For example, user device 105 may access cellular network 120 over wireless channel 125. Access over wireless channel 125 may be provided through a base station, eNodeB, etc., within cellular network 120, as will be described in more detail below in reference to an embodiment shown in FIG. 3. In various embodiments, cellular network 120, wide area wireless network 130, and/or local area wireless network 140 may also communicate among each other. User device 105 may also access network 115 over wireless channel 135 through wide area wireless network 130. Wide area wireless network 130 may include any type wireless network covering larger areas, and may include a mesh network (e.g., IEEE 801.11s) and/or or a WiMAX IEEE 802.16. User device 105 may access network 115 over wireless channel 145 through local area wireless network 140, which may include WiFi (e.g., a IEEE 801.11x network, whereby x=a, b, g, n, ac, ah, etc.). The wireless network(s) 110 may exchange data with wide area network 150 that may include backhaul networks, backbone networks, and/or core networks. Portal 160, content device 170 and/or validation device 180 may interface with wide area network 150, and thus with user device 105 over one or more of the air interfaces 125, 135, 145 through wireless network(s) 110.

User device 105 may obtain special access to network 115 over one or more air interfaces 125, 135, and/or 145. For example, a sponsor may support access of the user device 105 to certain data (e.g., landing page 101 and/or content 102) provided by content device 170. In another example, user device 105 may access landing page 101 and/or content 102 in a different manner (e.g., via a different path, a different network priority, a different protocol, etc.) than normally available in network 115 to user device 105. As used herein, content 102 may also be referred to herein as "media," and may include any type of digital data representing user-interpretable information, including text, image, audio, and/or video data. Media may also include one or more combinations of any type of digital data that may be arranged, composited, and presented to the user, such as, for example, in the form of webpages described using hypertext markup language (HTML).

Referring to FIG. 1, user device 105 may be an electronic device having communication capabilities and, thus, communicate over network 115 using a variety of different channels, including both wired and wireless connections. User device 105 may include, for example, a cellular radiotelephone, a smart phone, a wearable computer (e.g., a wrist watch, eye glasses, etc.), a tablet, a set-top box (STB), a mobile phone, any type of internet protocol (IP) communications device, a voice over internet protocol (VoIP) device, a laptop computer, a palmtop computer, a gaming device, a media player device, or a digital camera that includes communication capabilities (e.g., wireless communication mechanisms).

User device 105 may use applications or websites to download landing page 101 by making network requests using an associated network address. For example, landing page 101 may correspond to a HTML page that includes a hyperlink (or "link") or other input element that may be selected by user device 105 to access content 102 provided by content device 170, and the various data and/or services may be accessed via content 102. For example, landing page 101 may includes uniform resource locators (URLs) identifying network addresses of content 102. Although shown is being provided by content device 170, it should be appreciated that landing page 101 may include links to other content device 170 (not shown), such as content devices 170 associated with other content providers, data hosting services, application servers, etc.

To enable special handling of data and/or services (e.g., sponsored access via one or more portions of network 115), an associated URL may include data to enable the special handling. For example, a URL associated with landing page 101 may include an extension that identifies the special handling (e.g., priority routing, sponsored access, etc.) and data that enables special handling of landing page 101 within environment 100. For example, requests for sponsored content may be intercepted by network devices in backend infrastructure (not shown) which are responsible for tracking downloaded toll free data and billing sponsors for the cost of transmitting the data.

For example, user device 105 may include mobile applications and/or a mobile browser that support the special handling. For example, the mobile applications and/or mobile browser may download sponsored or other specially handled content by making network requests using an appropriately signed network address. The network requests may be intercepted by the network provider's existing service platform backend infrastructure, which may track downloaded data and bill the sponsor for the cost of the data used by the campaign.

For example, when user device 105 presents a URL associated with landing page 101, portal 160 may identify the extension or other data associated with the special handling. Portal 160 may initiate a session via network 115 in accordance with the special handling identified in the URL and forward the requested content 102 via the generated session. For example, if the special handling relates to sponsored data services, portal 160 may generate a session via network 115 and may notify a backend component, such as billing server, that the fees associated with data transmission on the session should be allocated to a sponsor. In another example, if the special handling relates to providing priority data handling of content 102, portal 160 may generate a session via network 115 and may notify a policy enforcement component that data transmitted via a session should be prioritized relative to other traffic transmissions in network 115.

Wireless network(s) 110 may include one or more wireless networks of any type, such as, for example, a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Wide area network 150 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Portal 160 may be a network device, such as a server, computer, etc., that receives a request for data provided by content device 170 (e.g., landing page 101 and/or content 102) and may determine whether the data should be forwarded to user device 105 using special handling procedures. For example, portal 160 may provide an interface to receive data from a sponsor identifying data, such as landing page 101 and/or content 102, that is eligible for sponsored (e.g., toll-free) access through network 115. Portal 160 may further interface with validation device 180 and/or a component of network 115 to obtain security credentials used for signing network addresses to validate requests from user device 105.

Content device 170 may be a network device (e.g., a web server, computer, media repository, streaming source, etc.) that may provide access to data (e.g., landing page 101 and/or content 102) associated with network addresses. For example, the signed network address may link to sponsored or other specially handled data which is hosted locally on content device 170 or remotely on another device. Content device 170 may be owned by the sponsor or act as an agent of the sponsor, serving as a "middle man" to provide access for sponsored content to user device 105 from any content provider identified by signed network identifiers.

As described herein, when user device 105 requests to access landing page 101 from content device 170, portal 160 may determine whether landing page 101 may be potentially eligible for special handling through network 115 to user device 105. For example, portal 160 may determine whether landing page 101 include links (e.g., URLs) to contents 102 that have been designated for special handling. If landing page 101 may potentially be eligible for special handling through network 115, portal 160 may (e.g., instead of forwarding the request for landing page 101 to content device 170) generate a redirect page 103. Redirect page 103 may include code, instructions, or script that, when implemented by user device 105, forwards data to validation device 180. For example, redirect page 103 may cause user device 105 to forward, to validation device 180, information identifying a URL for landing page 101 and/or one or more URLs associated with content 102. Additionally or alternatively, redirect page 103 may cause user device 105 to forward identifying information to validation device 180. The identifying may include, for example, an internet protocol (IP) address, a media access content (MAC address), a serial number, a telephone number, an international mobile subscriber identity (IMSI).

Validation device 180 may be a cloud-based application server associated with network 115. Validation device 180 may determine, based on information received from user device 105, whether special handling should be used to forward landing page 101 to user device 105. For example, validation device 180 may interact with backend components of network 115 to determine whether user device 105 is associated with a customer type (e.g., a residential consumer versus a business customer), a geographic location, a device type (e.g., a device compatible with the special handling), etc., that is designated to receive the special handling of landing page 101. Validation device 180 may then forward a validation reply to user device 105, and the validation reply may include, for example, a modified (e.g., "signed") URL or network address for landing page 101 and a redirect script (or code) that causes user device 105 to access landing page 101 using the modified URL. For example, the modified URL may include an extension or other data that indicates, to portal 160 that user device 105 has been evaluated for special handling to landing page 101 and may further indicate whether special handling should be used for landing page 101. In this way, user device 105 may be evaluated with respect to landing page or content 102 using a identifier and/or other potentially confidential information without sharing this information with content device 170 or a third party not associated with network 115.

When portal 160 detects the modified URL for landing page 101, portal 160 may selectively initiate special handling of landing page 101 to user device 105. For example, portal 160 may determine, based on the presence of the extension or other data in the modified URL that user device 105 has been evaluated by validation device 180. Portal 160 may further determine, based on the contents of the extension or other data in the modified URL whether special handling should be used for forward landing page 101 to user device 105. To enable the special handling, portal 160 may initiate an appropriate session, and may cause content device 170 to forward landing page 101 through this session.

In another implementation, portal 160 may store a record of the first attempt by user device 105 to obtain landing page 101. For example, portal 160 may store data indicating that user device 105 forwarded an unsigned URL for landing page 101. Subsequently, if portal 160 detects another attempt by user device 105 to access landing page 101 after being redirected to validation device 180 (e.g., using the unsigned URL), portal 160 may infer that validation device 180 determined that user device 105 should receive landing page 101 without special handling (e.g., without sponsorship). Portal 160 may then forward the unsigned URL to content device 170 to initiate delivery of landing page 101 to user device using conventional handling.

The number of devices and/or networks, illustrated in FIG. 1, is provided for explanatory purposes only. In practice, additional devices and/or networks, fewer devices and/or networks, different devices and/or networks, or differently arranged devices and/or networks than those illustrated in FIG. 1 may be used. Also, in some implementations, one or more of the displayed devices or networks may perform one or more functions described as being performed by another one or more of the other devices or networks. The devices and networks shown in FIG. 1 may interconnect via wired connections, wireless connections, or a combination of wired and wireless connections.

Figure 2:
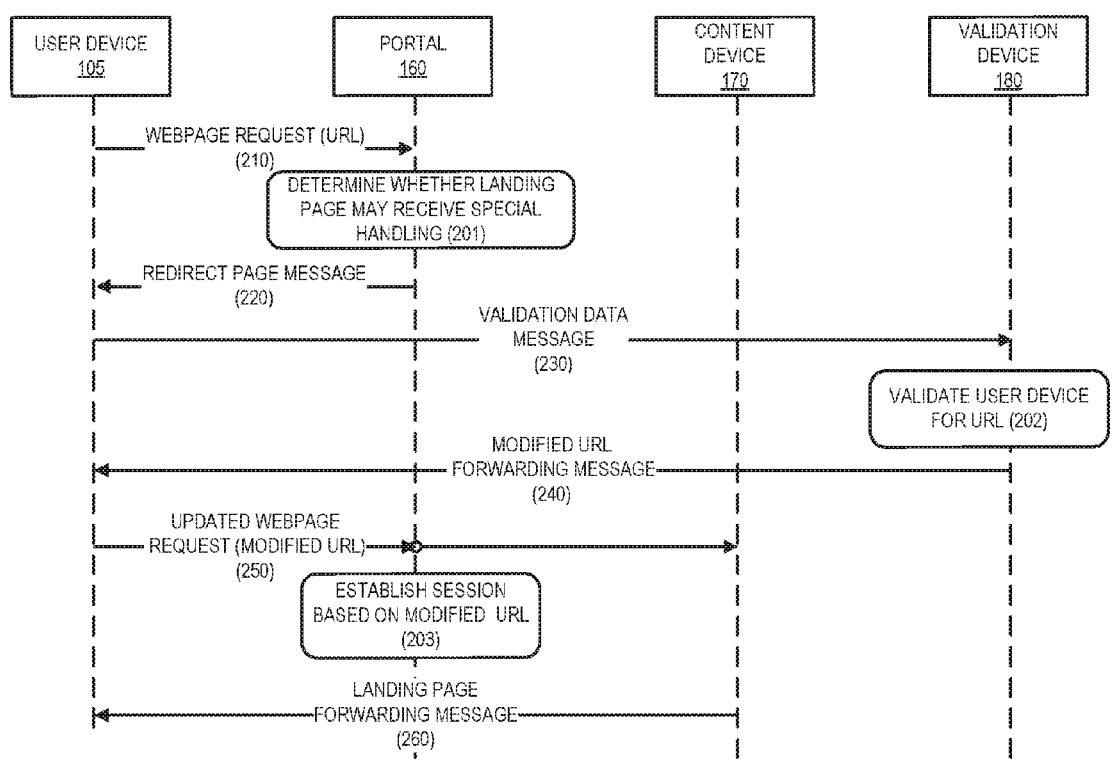
FIG. 2 is a diagram depicting an exemplary message flow between selected devices within the network environment shown in FIG. 1

FIG. 2 is depicts an exemplary message flow diagram 200 that relates to selectively using special handling to provide landing page 101 to user device. More specifically, as shown in FIG. 2, message flow diagram 200 may include messages between user device 105, portal 160, content device 170, and validation device 180 within the network environment shown in FIG. 1.

As shown in FIG. 2, user device 105 may forward a web page request (e.g., a URL) 210 for landing page 101. Web page request 210 may include a network address associated with a storage location for landing page 101. For example, web page request 210 may include a network address for content device 170 (or another device providing landing page 101) and other information (e.g., a port, memory portion, file name, etc.) associated with landing page 101. Web page request 210 may also include a network address or other information associated with user device 105.

As shown in FIG. 2, web page request 210, although directed to content device 170, may be intercepted by portal 160. For example, portal 160 may receive requests to content device 170 that are forwarded via a service network (e.g., network 115). As described in greater detail below with respect to FIG. 3, portal 160 may store data identifying whether landing page 101 should receive special handling when transmitted via network 115. For example, portal 160 may store data identifying network addresses associated with data to receive special handling when transmitted via network 115. As shown in FIG. 2, portal 160 may determine that landing page 101 may possibly receive special handling (e.g., if user device 105 is eligible to sponsored access to landing page 101) (block 201). For example, portal 160 may determine whether the network address for landing page 101 is included in the stored list of network addresses for special handled data.

Continuing with FIG. 2, portal 160 may generate redirect page 103 based on determining that landing page 101 may possibly receive special handling, and portal 160 may forward, as redirect page message 220, redirect page 103 to user device 105. As previously described, redirect page 103 may include code, instructions, or script that, when implemented by user device 105, causes user device 105 to forward a validation data message 230 to validation device

180. For example, redirect page 103 may cause user device 105 to forward validation data message 230 that identifies a URL for landing page 101. Additionally, validation data message 230 may include identifying information for user device 105.

Validation device 180 may validate user device 105 with respect to special handling of landing page 101 (block 202). For example, validation device 180 may determine whether user device 105 is eligible to receive special handling of landing page 101 through network 115. Validation device 180 may use the identifying information for user device 105, as included in validation data message 230, to interface with backend components of network 115 to obtain additional information regarding user device 105 and/or an associated user. For example, validation device 180 may determine a device type, compatible transmission protocols, a geographic location, account data, etc., associated with user device 105. Validation device 180 may then apply logical rules associated with special handling of landing page 101. For example, the logical rules may indicate that special handling (e.g., sponsor access) of landing page 101 may be used when user device 105 is associated with a specific type of customer for a wireless network service provider (e.g., a residential customer) in a specific geographic location.

As shown in FIG. 2, validation device 180 may modify (e.g., sign) the URL for landing page 101, and validation device 180 may forward a modified URL message 240 to user device 105. For example, validation device 180 may append an extension to the URL for landing page 101 and may forward the appended URL to user device 105 in modified URL message 240. The extension may include an indication, such as a specific string of alphanumeric characters, that special handling procedures should be used when forwarding landing page 101 to user device 105. Modified URL message 240 may include data identifying the signed URL for landing page 101. Modified URL message 240 may further include code, instructions, or script that causes user device 105 to be redirected to content device 170 using the modified (e.g., signed) URL. For example, the script in modified URL message 240 may cause user device 105 to forward updated webpage request 250, which includes the modified URL to content device 170, to again request access to landing page 101.

As shown in FIG. 2, portal 160 may intercept updated webpage request 250. Portal 160 may determine, based on the extension in the modified URL for landing page 101, that special handling procedures should be used to forward landing page 101 from content device 170 to user device 105. For example, portal 160 may establish a session based on the special handling identified in the modified URL (block 203), and portal 160 may forward the updated webpage request 250 to content device 170 to cause landing page 101 to be forwarded to user device 105 via the generated session, as landing page forwarding message 260.

While FIG. 2 shows exemplary messages in message flow diagram 200, in other implementations, message flow diagram 200 may include fewer messages, different messages, differently ordered messages, or additional messages than depicted in FIG. 2. Additionally, or alternatively, one or more messages of message flow diagram 200 may include data described as being included in one or more other messages of message flow diagram 200.

Figure 3:
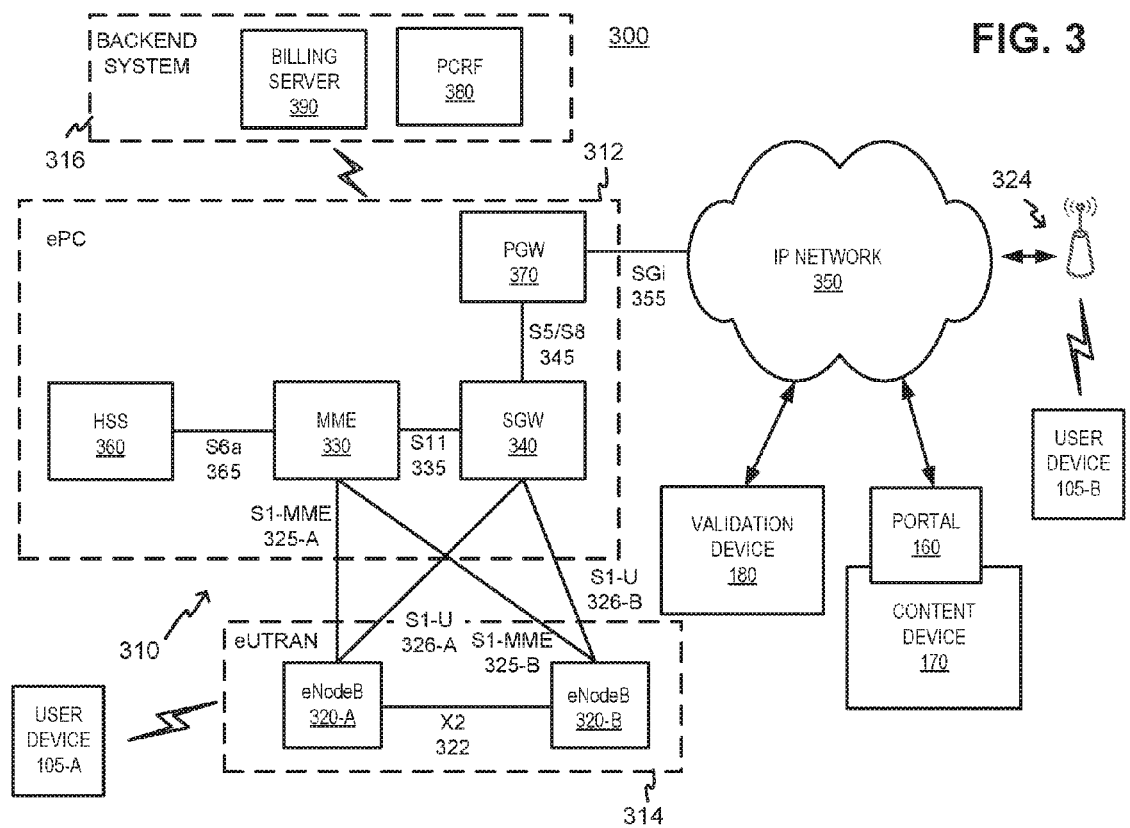
FIG. 3 is a block diagram of an exemplary wireless environment for providing special handling of a landing page.

FIG. 3 is a block diagram of an exemplary wireless networking system 300 that provides special handling of landing page 101 data over various types of wireless channels using redirect page 103 that causes user device 105 to be evaluated by validation device 180. As shown in FIG. 3, wireless networking system 300 may include user device 105, a wireless network 310 which includes an evolved Packet Core (ePC) 312 and an evolved UMTS Terrestrial Network (eUTRAN) 314, a backend system 316, an Internet Protocol (IP) network 350, a WiFi wireless access point (WAP) 324, portal 160, content device 170, and validation device 180. In wireless networking system 300, user device 105, portal 160, content device 170, and validation device 180 may operate in a manner consistent with the prior discussion of FIGS. 1 and 2.

Wireless network 310 may be a long-term evolution (LTE) network, and include one or more devices that are physical and/or logical entities interconnected via standardized interfaces. Wireless network 310 provides wireless packet-switched services and wireless IP connectivity to user devices to provide, for example, data, voice, and/or multimedia services. In this example, user device 105 (shown in FIG. 3 as user devices 105-A and 105-B) may correspond to user equipment (UE) adapted to communicate via wireless network 310 that corresponds to an LTE network. As shown in FIG. 3, ePC 312 may further include a mobility management entity (MME) 330, a serving gateway (SGW) device 340, a packet data network gateway (PGW) 370, and a home subscriber server (HSS) 360. The eUTRAN 314 may further include one or more eNodeBs 320-A and 320-B (herein referred to plurally as "eNodeB 320" and individually as "eNodeB 320-*x*"). As further shown in FIG. 3, backend systems 316 may include a policy and charging rule function (PCRF) 380 and a billing server 390.

eNodeB 320 may include one or more devices and other components having functionality that allow user device 105 to wirelessly connect to eUTRAN 314. eNodeB 320-A and eNodeB 320-B may each interface with ePC 312 via an S1 interface, which may be split into a control plane S1-MME interface 325-A/B and a data plane S1-U interface 326. For example, S1-MME interface 325-A may interface between MME device 330 and eNodeB 320-A. S1-MME interface 325-A may be implemented, for example, with a protocol stack that includes a Network Access Server (NAS) protocol and/or Stream Control Transmission Protocol (SCTP). S1-U interface 326-B may provide an interface between SGW 340 and eNodeB 320-A. S1-U interface 326-B may be implemented, for example, using a General Packet Radio Service Tunneling Protocol version 2 (GTPv2). eNodeB 320-A may communicate with eNodeB 320-B via an X2 interface 322. X2 interface 322 may be implemented, for example, with a protocol stack that includes an X2 application protocol and SCTP.

MME device 330 may implement control plane processing for ePC 312. For example, MME device 330 may implement tracking and paging procedures for user device 105, may activate and deactivate bearers for user device 105, may authenticate a user of user device 105, and may interface to non-LTE radio access networks. A bearer may represent a logical channel with particular quality of service (QoS) requirements. MME device 330 may also select a particular SGW 340 for a particular user device 105. A particular MME device 330 may interface with other MME devices 330 in ePC 312 and may send and receive information associated with user devices 105, which may allow one MME device to take over control plane processing of user devices 105 serviced by another MME device, if the other MME device becomes unavailable.

SGW 340 may provide an access point to and from user device 105, may handle forwarding of data packets for user device 105, and may act as a local anchor point during handover procedures between eNodeBs 320. SGW 340 may interface with PGW 370 through an S5/S8 interface 345. S5/S8 interface 345 may be implemented, for example, using GTPv2.

PGW 370 may function as a gateway to IP network 350 through a SGi interface 355. IP network 350 may include, for example, an IP Multimedia Subsystem (IMS) network, which may provide voice and multimedia services to user device 105, based on Session Initiation Protocol (SIP). A particular user device 105, while connected to a single SGW 340, may be connected to multiple PGWs 370, one for each packet network with which user device 105 communicates.

Alternatively, user device 105 may exchange data with IP network 350 though WiFi wireless access point (WAP) 324. The WiFi WAP 324 may be part of a local area network, and access IP network 350 through a wired connection via a router. Alternatively, WiFi WAP 324 may be part of a mesh network (e.g., IEEE 801.11s). WiFi WAP 324 may be part of a local area network, or part of a wide area network (WiMaxx) or a mesh network (IEEE 801.11s).

MME device 330 may communicate with SGW 340 through an S11 interface 335. S11 interface 335 may be implemented, for example, using GTPv2. S11 interface 335 may be used to create and manage a new session for a particular user device 105. S11 interface 335 may be activated when MME device 330 needs to communicate with SGW 340, such as when the particular user device 105 attaches to ePC 312, when bearers need to be added or modified for an existing session for the particular user device 105, when a connection to a new PGW 370 needs to be created, or during a handover procedure (e.g., when the particular user device 105 needs to switch to a different SGW 340).

HSS device 360 may store information associated with user devices 105 and/or information associated with users of user devices 105. For example, HSS device 360 may store user profiles that include authentication and access authorization information. MME device 330 may communicate with HSS device 360 through an S6a interface 365. S6a interface 365 may be implemented, for example, using a Diameter protocol.

As previously described, portal 160 may be configured to detect and redirect requests for landing page 101 and may cause content device 170 to selectively apply special handling when forward landing page 101 to user device 105. For example, portal 160 may generate a session through a standard TCP/IP interface with IP network 350, and the session may further include ePC 312 using SGi 355, and content device 170 may forward data associated with landing page 101 via the generated session. Communications between content device 170 and user devices 105 may be performed through ePC 312 and eUTRAN 314 as shown for user device 105-A, or through WiFi WAP 324 as shown for user device 105-B. The communications between content device 170 and user device 105 may be channel agnostic, and thus may be performed using any known wireless and/or wired channels, or combinations thereof. Accordingly, other methods for communication between content device 170 and user device 105 may be used which are not illustrated in FIG. 3.

Validation device 180 may communicate with user device 105 via IP network 350. For example, validation device 180 may be associated with a cloud-based service for evaluating the eligibility of user device 105 to receive landing page 101 using special handling (e.g., sponsored access).

PCRF 380 may provide policy control decisions and flow based charging control functionalities. PCRF 380 may provide network control regarding service data flow detection, gating, quality of service (QoS) and flow based charging, etc. PCRF 380 may determine how a certain service data flow shall be treated, and may ensure that user plane traffic mapping and treatment are in accordance with a user's subscription profile. For example, PCRF 380 may identify and apply a user profile related to user device 105 when exchanging data using a conventional handling procedures. In other instances, when landing page 101 is transmitted using special handling procedures, PCRF 380 may apply an alternative, different user profile (e.g., so landing page 101 can be forwarded to user device 105 with a different network priority, along a different path, using a different transmission protocol, using different security/encryption techniques, etc.).

Billing server 390 may store data identifying changes in services (e.g., based on receiving instructions from portal 160) and may modify user and device profiles, as applied by HSS 360 and/or PCRF 380 based on the service changes. Billing server 390 may further determine and collect fees associated the requested service changes. For example, billing server 390 may charge a service fee to user device 105 for accessing landing page 101 when specialized (e.g., sponsored) data access is not authorized by validation device 180. Additionally, billing server 390 may be programmed to charge a sponsor, and not user device 105, for accessing landing page 101 when the sponsored data access is authorized by validation device 180 with respect to user device 105.

While FIG. 3 shows exemplary components of system 300, in other implementations, wireless networking system 300 may include fewer components, different components, differently arranged components, or additional components than depicted in FIG. 3. Additionally, or alternatively, one or more components of wireless networking system 300 may perform functions described as being performed by one or more other components of wireless networking system 300.

Figure 4:
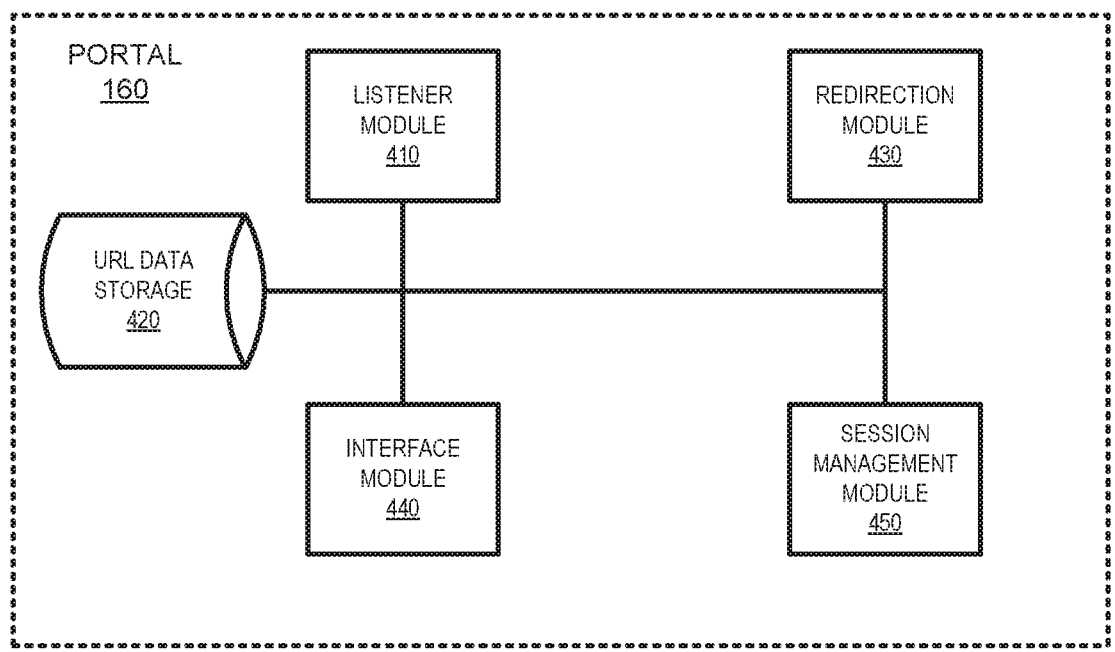
FIG. 4 is a block diagram showing exemplary components of a portal included in the environment of FIG. 1 according to an embodiment.

FIG. 4 is a block diagram showing exemplary components of portal 160 according to one implementation. As shown in FIG. 4, portal 160 may include a listener module 410, a URL data storage 420, a redirection module 430, an interface module 440, and a session management module 450.

Listener module 410 may be positioned within network 115 to intercept requests to content device 170 for landing page 101 and/or content 102. For example, listener module 410 may detect when an URL for landing page 101 is received from user device 105. When the URL for landing page 101 is detected, listener module 410 may determine whether landing page 101 is identified as potentially being eligible for special handling procedures, such as sponsored access. For example, listener module 410 may determine whether the URL (or network address) for landing page 101 is included in a list, maintained of URL data storage 420 of URLs for webpages provided by content device 170 that may be eligible for special handling procedures. Furthermore, listener module 410 may determine whether the received URL for landing page 101 includes an extension or other indication that the special handling procedures should be used to forward landing page 101 to user device 105.

As previously described, URL data storage 420 may maintain a list of URLs for webpages provided by content device 170 that may be eligible for special handling procedures. Interface module 440 may enable content device 170 designate certain webpages for special handling procedures. Additionally, interface module 440 may enable a component of network 115 (e.g., PCRF 380 or billing server 390) to identify certain webpages eligible for special handling procedures.

Redirection module 430 may selectively generate redirect page 103 and may forward the generated redirect page to user device 105. For example, redirection module 430 may generate redirect page 103 when the URL for landing page 101 is received, the URL for landing page 101 is included in URL data storage 420, but the URL for landing page 101 does not include an extension or other data indicating whether special handling procedures should be used when sending landing page 101 to user device 105. As previously described, landing page 101 may include code that causes user device 105 to be automatically redirected to validation device 180. If validation device 180 determines that special handling procedures should be used to deliver landing page 101 to user device 105, validation device 180 may sign the URL for landing page 101 (e.g., add an extension identifying the special handling). Validation device 180 may forward the signed URL to user device 105, and user device 105 may forward the signed URL toward content device 170 to again request landing page 101.

Listening module 410 may detect the signed URL from user device 105 and may determine, based on the extension added by validation device 180, that content device 170 should forward landing page 101 to user device 105 using the special handling procedures. To implement the special handling procedures, session management module 450 may establish a session in accordance with the special handling procedure. For example, if the special handling procedure includes routing data about landing page 101 through a particular node or pathway in network 115, session management module 450 may establish the session through the particular node or pathway. Session management module 450 may further modify the signed URL to include information identifying the session, and may forward the modified signed URL to content device 170. Content device 170 may then forward data regarding landing page 101 via the session initiated by session management module 450.

While FIG. 4 shows exemplary components of portal 160, in other implementations, portal 160 may include fewer components, different components, differently arranged components, or additional components than depicted in FIG. 4. Additionally, or alternatively, one or more components of portal 160 may perform functions described as being performed by one or more other components of portal 160.

Figure 5:
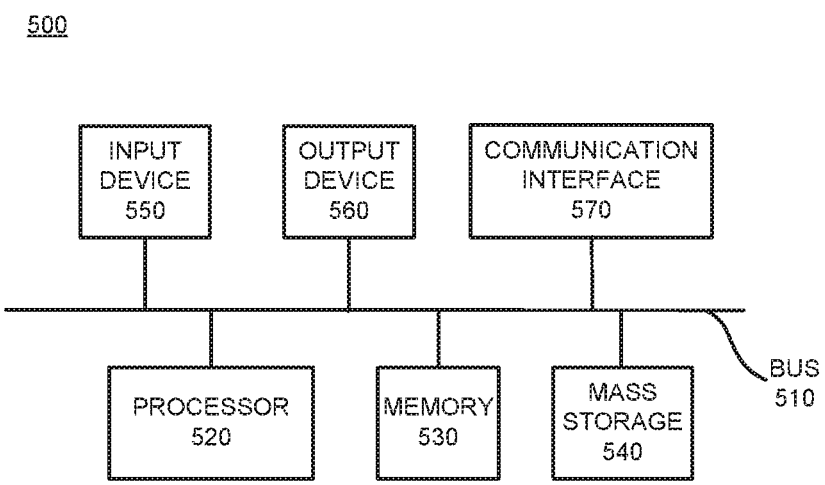
FIG. 5 is a is a block diagram showing exemplary components of a computing device included in the environment of FIG. 1 according to an embodiment.

FIG. 5 is a block diagram showing exemplary components of a computing device 500 according to one implementation. As shown in FIG. 5, computing device 500 may include a bus 510, a processor 520, a memory 530, mass storage 540, an input device 550, an output device 560, and a communication interface 570. User device 105, portal 160, content device 170, validation device 180, or other components illustrated in FIGS. 1 and 3 may each include one or more computing devices 500.

Bus 510 includes a path that permits communication among the components of computing device 500. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic. For example, processor 520 may be an x86 based CPU, and may use any operating system, which may include varieties of the Windows, UNIX, and/or Linux operating systems. Processor 520 may also use high-level analysis software packages and/or custom software written in any programming and/or scripting languages for interacting with other network entities are communicatively coupled to WAN 150.

Memory 530 may include any type of dynamic storage device that may store information and/or instructions, for execution by processor 520, and/or any type of non-volatile storage device that may store information for use by processor 520. For example, memory 530 may include a random access memory (RAM) or another type of dynamic storage device, a read only memory (ROM) device or another type of static storage device, and/or a removable form of memory, such as a flash memory. Mass storage 540 may include any type of on-board device suitable for storing large amounts of data, and may include one or more hard drives, solid state drives, and/or various types of redundant array of independent disks (RAID) arrays.

Input device 550 may enable an operator to input information into computing device 500, if desired. Input device 550 may include, for example, a keyboard, a mouse, a pen, a microphone, a remote control, an audio capture device, an image and/or video capture device, a touch-screen display, and/or another type of input device. In some embodiments, computing device 500 may be managed remotely and may not include input device 550. Output device 560 may output information to an operator of computing device 500. Output device 560 may include a display (such as a liquid crystal display (LCD)), a printer, a speaker, and/or another type of output device. In some embodiments, computing device 500 may be managed remotely and may not include output device 560.

Communication interface 570 may include a transceiver that enables computing device 500 to communicate within network 115 with other devices and/or systems. The communication interface 570 may be configured to exchange data with WAN 150 over wired communications (e.g., conductive wire, twisted pair cable, coaxial cable, transmission line, fiber optic cable, and/or waveguide, etc.), or a combination of wireless. In other embodiments, communication interface 570 may interface with wide area network 150 using a wireless communications channel, such as, for example, radio frequency (RF), infrared, and/or visual optics, etc. Communication interface 570 may include a transmitter that converts baseband signals to RF signals and/or a receiver that converts RF signals to baseband signals. Communication interface 570 may be coupled to one or more antennas for transmitting and receiving RF signals. Communication interface 570 may include a logical component that includes input and/or output ports, input and/or output systems, and/or other input and output components that facilitate the transmission/reception of data to/from other devices. For example, communication interface 570 may include a network interface card (e.g., Ethernet card) for wired communications and/or a wireless network interface (e.g., a WiFi) card for wireless communications. Communication interface 570 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

Computing device 500 may perform various operations, and computing device 500 may perform these operations in response to processor 520 executing software instructions contained in a computer-readable medium, such as memory 530 and/or mass storage 540. The software instructions may be read into memory 530 from another computer-readable medium or from another device. The software instructions contained in memory 530 may cause processor 520 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 5 shows exemplary components of computing device 500, in other implementations, computing device 500 may include fewer components, different components, additional components, or differently arranged components than depicted in FIG. 5. Additionally, or alternatively, one or more components of computing device 500 may perform functions described as being performed by one or more other components of computing device 500.

Figure 6:
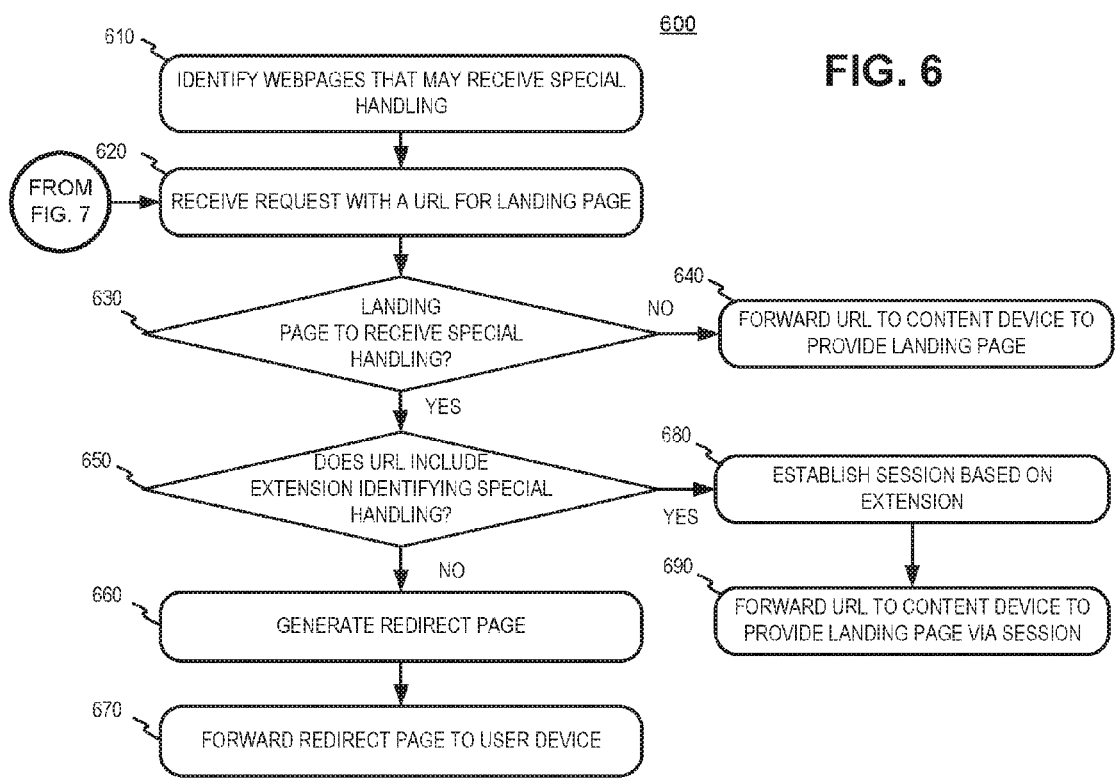
FIG. 6 is a flow chart showing an exemplary process for selectively providing special handling of a landing page.

FIG. 6 is a flow diagram showing an exemplary process 600 for selectively providing special handling of landing page 101. In one embodiment, process 600 may be performed by portal 160. In other embodiments, one or more portions of process 600 may performed by one or more other components of environment 100 and/or wireless networking system 300, such as content device 170, validation device 180 and/or a component of network 115.

As shown in FIG. 6, process 600 may include portal 160 identifying webpages that may receive special handling (block 610). As previously described, portal 160 may include URL data storage 420 that maintains URLs (or network addresses) identifying data that may receive special handling. For example, URL data storage 420 may store data received via interface module 440 from content device 170 and/or a component of wireless networking system 300 (e.g., PCRF 380 and/or billing server 390) specifying that landing page 101 and/or content 102 at content device 170 should receive special handling. In another example, portal 160 may evaluate contents included in landing page 101 and determine, based on these contents, that landing page 101 should receive special handling. For example, portal 160 may determine than landing page 101 includes multimedia content or other data that should receive special handling (e.g., routing through specific nodes within networking environment 100) to achieve desired transmission characteristics (e.g., transmission time, lag, bandwidth, jitter, packet drops, etc.) and/or receive special billing related handling (e.g., toll-free data service to user device 105) when forwarding landing page 101 to user device 105.

Portal 160 may detect a request from user device with a URL for landing page 101 105 (block 620) and portal 160 may determine whether landing page 101 is to receive special handling (block 630). For example, listener module 410 of portal 160 may be positioned to receive URLs directed to content device 170 and may identify when the URL for landing page 101 is received from user device 105. Listener module 410 may further determine whether the URL for landing page 101 is included in a list of URLs stored in URL data storage 420 identifying specially handling data.

If portal 160 determines that landing page 101 should not receive special handling (block 630—No), portal 160 may forward the URL to content device 170 to provide landing page 101 (block 640). For example, session management module 450 in portal 160 may establish a session based on account records for user device 105 stored in PCRF 380 (e.g., using conventional handling procedures), and content device 170 may forward landing page 101 to user device 105 via the session.

If portal 160 determines that landing page 101 may receive special handling (block 630—Yes), portal 160 may determine whether the URL for the landing page, received from user device 105, includes an extension or other data indicating whether special handling should be used for the landing page (block 650). When the URL for landing page 101 does not include the extension regarding special handling (block 650—No) (e.g., user device 105 is requesting landing page 101 before being evaluated by validation device 180), portal 160 may generate redirect page 103 (block 660) and forward the redirect page 103 to user device 105 without forwarding the landing page (block 670). The redirect page is provided to user device 105 without special handling (e.g., associated data access is paid by user device 105), but the redirect page is relatively small compared to landing page 101. In one implementation, the redirect page may also include information that may be used for the special handling, such as data identifying a sponsor or a campaign associated with the sponsored accessed. For example, redirection module 430 may generate script that causes user device 105, when executing the script, to forward data identifying user device 105 and landing page 101 to validation device 180. For example, as described in greater detail below with respect to FIG. 7, validation device 180 may determine whether special handling should be used for providing landing page 101 to user device 105, and validation device 180 may sign the URL (e.g., add an extension regarding the special handling) and may return the signed URL to user device 105. User device 105 may then re-request landing page 101 using the signed URL (point A in FIG. 6).

When the URL for landing page 101 includes the extension regarding special handling (block 650—Yes) (e.g., when user device 105 is re-requesting landing page 101 using the signed URL from validation device 180), portal 160 may establish a session based on the extension (block 680) and may forward the URL to content device 170 to provide landing page 101 via the session (block 690). For example, session management module 450 may generate the session based on the data included in the extension identifying whether the special handling. For example, user device 105 receives sponsored (e.g., toll-free) access to landing page 101, session management module 450 may generate a session in which data transfer fees are billed to a sponsor. Alternatively, if the extension indicates the user device 105 is not eligible for the special handling (e.g., user device 105 should be billed for accessing land page 101 via wireless networking system 300), session management module 450 may generate a session in which data transfer fees are billed to user device 105.

In one implementation, the redirect URL may enable user device 105 to access additional content 102 when special access is authorized for landing page 101. For example, the additional content 102 may identify media, services, and/or applications that may be accessed by user device 105 and that may not be available through non-special handling.

FIG. 7 is a flow chart showing an exemplary process 700 for determining whether user device 105 is eligible for special handling of landing page 101. In one embodiment, process 700 may be performed by validation device 180. In other embodiments, one or more portions of process 700 may performed by one or more other components of environment 100 and/or wireless networking system 300, such as portal 160, content device 170, and/or a component of network 115.

As shown in FIG. 7, process 700 may include validation device 180 receiving validation data from user device 105

(block 710) and parsing the validation data to identify the URL for landing page 101 and user device 105 (block 720). For example, redirect page 103 may cause user device 105 to forward the redirect data to validation device 180. For example, redirect page 103 may include script, that when implemented by user device 105, to establish a session via wireless networking system 300 and to forward the unsigned URL for landing page 101 via the session. Validation device 180 may receive the URL for landing page 101 via the session and may identify URL based on the session data (e.g., based on a source address included in the data forwarding the URL. The validation data may include further include additional information, such as location associated with user device 105, subscriber information associated with user device 105 (e.g., whether user device 105 is associated with a subscriber to wireless data services offered by a service provider), activities being performed by user device 105, hardware/software present on user device 105, etc.

Validation device 180 may determine whether user device 105 is eligible for special handling of landing page 101 (block 730). For example, validation device 180 may interface with a component of networking environment (e.g, PCRF 380 and/or billing server 390) to identify eligibility criteria for the special handling, and validation device 180 may determine whether user device 105 conforms to the eligibility criteria. In another example, validation device 180 may evaluate software and/or hardware included in user device 105 (as identified in the validation data) and may determine whether the software and/or hardware is compatible with the special handling associated with landing page 101.

As shown in FIG. 7, validation device 180 may generate an extension for (e.g., sign) the URL for landing page 101 (block 740) and may forward the extension to user device 105 (block 750). For example, validation device 180 may generate an extension identifying the special handling when user device 105 is eligible for the special handling, and otherwise, validation device 180 may generate a different extension when user device 105 is not eligible for the special handling.

In one embodiment, validation device 180 may sign the network address for landing page 101 using cryptographic techniques to improve security by appending information to the original network address (e.g., the URL) based on one or more security credentials (e.g., a signing key identifier and/or a signing secret) associated with the special handling. For example, when the special handling relates to sponsored access to landing page 101, the signed URL address may contain special network destination information of the sponsored content, identifiers of various entities (e.g., a sponsor, a content provider, etc.), a security signature, and additional parameters that may be used in backend devices by the network provider for data accounting and billing processes.

In an embodiment, validation device 180 may sign the URL based on a keyed-hash message authentication code (HMAC) which is a process for calculating a message authentication code (MAC) involving a cryptographic hash function in combination with a secret cryptographic key. The HMAC process may be used to simultaneously verify both the data integrity and the authentication of a message. A cryptographic hash function, such as a fifth generation message digest (MD5) algorithm or a secure hash algorithm 1 (SHA-1), may be used in the calculation of an HMAC.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 2, 6, and 7, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    intercepting, by a processor, a request from a user device to access a landing page associated with a content device, wherein the landing page identifies other content that is accessible through the content device;
    determining, by the processor, whether the landing page is to be sent from the content device using special handling;
    forwarding, by the processor and based on determining that the landing page is not to be sent from the content device using the special handling, the request to the content device to send the landing page without using the special handling;
    forwarding, by the processor and based on determining that the landing page is to be sent from the content device using the special handling, a redirect page, wherein the redirect page includes instructions that, when executed by the user device, causes the user device to forward information associated with the request to a validation device, wherein the validation device forwards a modified request to the user device, and wherein the modified request includes an indication specifying whether the content device is to forward the landing page to the user device using the special handling;

intercepting, by the processor, the modified request from the user device;

forwarding, by the processor and when the indication specifies that the landing page is not to be sent to the user device using the special handling, the request to the content device to send the landing page without using the special handling;

initiating, by the processor, the special handling when the indication specifies that the landing page is to be sent to the user device using the special handling; and forwarding, by the processor and based on initiating the special handling, the request to the content device to send the landing page using the special handling.

2. The method of claim 1, wherein the special handling relates to sponsored access to the landing page via a service network.

3. The method of claim 2, wherein the indication included in the modified request identifies a sponsor to be billed for the sponsored access to the landing page.

4. The method of claim 1, wherein the special handling relates to routing the landing page to the user device through a specific node in a service network.

5. The method of claim 1, wherein the request includes a universal resource locator (URL) for the landing page, and wherein the indication includes an extension to the URL.

6. The method of claim 1, wherein initiating the special handling includes establishing a session based on the special handling, wherein the content device forwards the landing page to the user device via the session.

7. The method of claim 1, wherein the redirect page further causes the user device to forward identifying data to the validation device, and wherein the validation device determines, based on the identifying data, whether the user device is eligible for the special handling when receiving the landing page.

8. A device comprising:
a memory configured to store instructions; and
a processor configured to execute one or more of the instructions to:
intercept a request from a user device to access a landing page associated with a content device, wherein the landing page identifies other content that is accessible through the content device;
determine whether the landing page is to be sent from the content device using special handling;
forward, based on determining that the landing page is not to be sent from the content device using the special handling, the request to the content device to send the landing page without using the special handling;
forward, based on determining that the landing page is to be sent from the content device using the special handling, a redirect page, wherein the redirect page includes instructions that, when executed by the user device, causes the user device to forward information associated with the request to a validation device, wherein the validation device forwards a modified request to the user device, and wherein the modified request includes an indication specifying whether the content device is to forward the landing page to the user device using the special handling;
intercept the modified request from the user device;
forward, when the indication specifies that the landing page is not to be sent to the user device using the special handling, the request to the content device to send the landing page without using the special handling;
initiate the special handling when the indication specifies that the landing page is to be sent to the user device using the special handling; and
forward, based on initiating the special handling, the request to the content device to send the landing page using the special handling.

9. The device of claim 8, wherein the special handling relates to sponsored access to the landing page via a service network.

10. The device of claim 9, wherein the indication included in the modified request identifies a sponsor to be billed for the sponsored access to the landing page.

11. The device of claim 8, wherein the special handling relates to routing the landing page to the user device through a specific node in a service network.

12. The device of claim 8, wherein the request includes a universal resource locator (URL) for the landing page, and wherein the indication includes an extension to the URL.

13. The device of claim 8, wherein the processor, when initiating the special handling, is further configured to:
establish a session based on the special handling, wherein the content device forwards the landing page to the user device via the session.

14. The device of claim 8, wherein the redirect page further causes the user device to forward identifying data to the validation device, and wherein the validation device determines, based on the identifying data, whether the user device is eligible for the special handling when receiving the landing page.

15. A non-transitory memory to store instructions comprising:
one or more of the instructions, that, when executed by a processor, cause the processor to:
intercept a request from a user device to access a landing page associated with a content device, wherein the landing page identifies other content that is accessible through the content device;
determine whether the landing page is to be sent from the content device using special handling;
forward, based on determining that the landing page is not to be sent from the content device using the special handling, the request to the content device to send the landing page without using the special handling;
forward, based on determining that the landing page is to be sent from the content device using the special handling, a redirect page, wherein the redirect page includes instructions that, when executed by the user device, causes the user device to forward information associated with the request to a validation device, wherein the validation device forwards a modified request to the user device, and wherein the modified request includes an indication specifying whether the content device is to forward the landing page to the user device using the special handling;
intercept the modified request from the user device;
forward, when the indication specifies that the landing page is to not be sent to the user device using the special handling, the request to the content device to send the landing page without using the special handling;

initiate the special handling when the indication specifies that the landing page is to be sent to the user device using the special handling; and forward, based on initiating the special handling, the request to the content device to send the landing page using the special handling.

16. The non-transitory memory of claim 15, wherein the special handling relates to sponsored access to the landing page via a service network, and wherein the indication included in the modified request identifies a sponsor to be billed for the sponsored access to the landing page.

17. The non-transitory memory of claim 15, wherein the special handling relates to routing the landing page to the user device through a specific node in a service network.

18. The non-transitory memory of claim 15, wherein the request includes a universal resource locator (URL) for the landing page, and wherein the indication includes an extension to the URL.

19. The non-transitory memory of claim 15, wherein the one or more instructions further cause the processor, when initiating the special handling, to:

establish a session based on the special handling, wherein the content device forwards the landing page to the user device via the session.

20. The non-transitory memory of claim 15, wherein the redirect page further causes the user device to forward identifying data to the validation device, and wherein the validation device determines, based on the identifying data, whether the user device is eligible for the special handling when receiving the landing page.

* * * * *